(12) United States Patent
Yasuda (10) Patent No.: US 12,070,025 B2
(45) Date of Patent: Aug. 27, 2024

(54) FISHING REEL

(71) Applicant: GLOBERIDE, Inc., Tokyo (JP)

(72) Inventor: Hiromu Yasuda, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 18/204,808

(22) Filed: Jun. 1, 2023

(65) Prior Publication Data

US 2023/0301287 A1   Sep. 28, 2023

Related U.S. Application Data

(63) Continuation of application No. 17/411,681, filed on Aug. 25, 2021, now Pat. No. 11,696,575.

(30) Foreign Application Priority Data

Aug. 27, 2020   (JP) .................................. 2020-143242

(51) Int. Cl.
*A01K 89/01*    (2006.01)
*A01K 89/015*   (2006.01)
*A01K 89/0155*  (2006.01)

(52) U.S. Cl.
CPC ...... *A01K 89/0155* (2013.01); *A01K 89/0187* (2015.05)

(58) Field of Classification Search
CPC .............. A01K 89/012; A01K 89/0155; A01K 89/017; A01K 89/033; A01K 89/01
See application file for complete search history.

(56) References Cited

U.S. PATENT DOCUMENTS

| | | | |
|---|---|---|---|
| 4,445,786 A | 5/1984 | Jackson | |
| 4,693,125 A | 9/1987 | Krutz | |
| 4,752,878 A | 6/1988 | Sigurdsson | |
| 5,524,831 A * | 6/1996 | Carlson | ............... A01K 87/007 242/223 |
| 5,782,033 A | 7/1998 | Park | |
| 2004/0227029 A1* | 11/2004 | Ikuta | ................ A01K 89/01555 242/288 |
| 2007/0108330 A1 | 5/2007 | Ikuta et al. | |
| 2010/0000143 A1 | 1/2010 | Pekin | |
| 2017/0208789 A1 | 7/2017 | Numata | |
| 2020/0165109 A1* | 5/2020 | Niitsuma | ................. B66D 1/40 |

FOREIGN PATENT DOCUMENTS

| | | | | |
|---|---|---|---|---|
| CH | 715756 A2 | 7/2020 | | |
| CN | 1496677 A * | 5/2004 | ............. | A01K 91/20 |
| CN | 105766835 A * | 7/2016 | ............. | A01K 89/01 |
| CN | 109511620 B | 12/2021 | | |

(Continued)

OTHER PUBLICATIONS

Sep. 25, 2023 Office Action issued in Korean Patent Office Action No. 10-2021-0111561.

(Continued)

*Primary Examiner* — Emmanuel M Marcelo
(74) *Attorney, Agent, or Firm* — Oliff PLC (57) ABSTRACT

A fishing reel according to an embodiment of the present disclosure has an operation portion, and is configured, where the operation portion is manipulated, to operate a first function when the fishing reel is in a first state, and a second function when the fishing reel is in a second state.

8 Claims, 4 Drawing Sheets

(56) References Cited

FOREIGN PATENT DOCUMENTS

| DE | 102019214659 A1 | * | 4/2020 | ........... A01K 89/006 |
|---|---|---|---|---|
| GB | 2517711 A | * | 3/2015 | ............. A01K 89/01 |
| JP | H11-046646 A | | 2/1999 | |
| JP | 2002125540 A | | 5/2002 | |
| JP | 2007135417 A | | 6/2007 | |
| JP | 2017055712 A | | 3/2017 | |
| KR | 20040063818 A | | 7/2004 | |
| KR | 20190062289 A | * | 6/2019 | ........... A01K 89/015 |
| WO | 2019106360 A1 | | 6/2019 | |

OTHER PUBLICATIONS

Office Action for related Japanese Application No. 2020-143242; action dated May 9, 2023; (10 pages).
Office Action for related Chinese Application No. 202110969038.X; action dated Sep. 27, 2022; (24 pages).
Jan. 10, 2024 Office Action issued in Japanese Application No. 2023-113027.

* cited by examiner

| Time | Event | Line Length | Handle Speed | Position |
|---|---|---|---|---|
| 07:21:30 | Catching fish | 15.2m | 52rpm | E140.1234, N36.1234 |
| 08:11:55 | Hit | 20.3m | 48rpm | E140.1234, N36.1234 |
| 08:12:49 | Hit | 5.3m | 96rpm | E140.1234, N36.1234 |
| 08:35:22 | Snagging | 11.2m | 20rpm | E140.1234, N36.1234 |
| 09:11:45 | Catching fish | 8.3m | 35rpm | E140.1234, N36.1234 |

■ Total
   Catch of fish:  2
   Hit:            2
   Snagging:     1

FIG. 4

FISHING REEL

CROSS-REFERENCE TO RELATED APPLICATIONS

This application is a Continuation Application of U.S. application Ser. No. 17/411,681, filed on Aug. 25, 2021, which claims priority under 35 U.S.C. § 119 to Japanese Patent Application No. 2020-143242 filed on Aug. 27, 2020, in the Japanese Intellectual Property Office, the entire contents of each hereby incorporated by reference.

FIELD

The present disclosure relates to a fishing reel having an operation means.

BACKGROUND

Conventionally, a fishing reel is configured so that adjustments can be made to various characteristic values, such as characteristic setting of a casting brake, drag force setting, and setting of winding speed (electric motor reel).

As such a reel, for example, Japanese Patent Application Publication No. 2007-135417 ("Patent Literature 1") discloses a spool braking device of a double-bearing reel that is used for casting, is rotatably mounted on a reel body and brakes a spool to which a fishing line is attached, and that includes a spool braking means that is provided on the spool and the reel body, and that electrically controllably brakes the spool, a first operation tool that is movably provided on the reel body and is operable to a plurality of first operation positions, a second operation tool that is movably provided on the reel body and is operable to a plurality of second operation positions, and a spool control means that electrically controls the braking force of the spool braking means according to the first operation positions of the first operation tool and the second operation positions of the second operation tool.

SUMMARY

However, in the spool braking device of a double-bearing reel according to Patent Literature 1, since the characteristic value of the reel is adjusted (braking force adjustment) by a mechanical dial, there was a problem that the dial has little layout flexibility. There was also a problem that the operating means was only used for adjusting a casting brake and therefore, could not record events such as a hit of fish and snagging. Another problem was that it was difficult to perform a plurality of functions with a single operation because of the constraints of the mechanism.

The present disclosure has been made in view of the above circumstances, and the objective thereof is to provide a reel with an operation means with high layout flexibility, a reel capable of recording events, or a reel capable of performing a plurality of functions with a single operation means. Other purposes of the present disclosure will become apparent upon reference to this specification in its entirety.

A fishing reel according to an embodiment of the present disclosure has an operation portion (operation unit), and a braking device capable of electrically changing characteristics, and is configured, when the operation portion is manipulated, to adjust the braking force of the braking device.

In a fishing reel according to an embodiment of the present disclosure, the operation portion is any one of a toggle switch, a membrane switch, a push button switch, a touch panel, or an operation lever, and is configured to be provided on a side face of the fishing reel.

A fishing reel according to an embodiment of the present disclosure is configured to include an operation portion and a recorder (recording unit or recording portion) capable of recording time during the operation of the operation portion.

In a fishing reel according to an embodiment of the present disclosure, the operation portion is configured to be an operation button.

A fishing reel according to an embodiment of the present disclosure is configured to be capable of recording the state of the fishing reel during the operation of the operation portion.

In a fishing reel according to an embodiment of the present disclosure, the state of the fishing reel is configured to include the length of a fishing line, the winding speed of a spool, the tension of the fishing line, or GPS information.

A fishing reel according to an embodiment of the present disclosure is configured to be capable of recording different events according to the operation method of the operation portion.

A fishing reel according to an embodiment of the present disclosure has an operation portion, and is configured, where the operation portion is manipulated, to operate a first function when the fishing reel is in a first state, and a second function when the fishing reel is in a second state.

A fishing reel according to an embodiment of the present disclosure has an operation portion, and is configured to perform a first function when a first operation of the operation portion is performed, and a second function when a second operation of the operation portion is performed.

In a fish fishing reel according to an embodiment of the present disclosure, the first state is a state in which a fishing line can be unwound, and the second state is a state in which the fishing line cannot be unwound.

In a fishing reel according to an embodiment of the present disclosure, the state in which the fishing line cannot be unwound is a state in which the fishing line can be wound.

A fishing reel according to an embodiment of the present disclosure includes an attitude sensor, wherein the first state is a state in which the fishing reel is in a first attitude, and the second state is a state in which the fishing reel is in a second attitude.

In a fishing reel according to an embodiment of the present disclosure, the first state is a state in which the length of the unwound fishing line is less than a predetermined value, and the second state is a state in which the length of the unwound fishing line is equal to or greater than a predetermined value.

In a fishing reel according to an embodiment of the present disclosure, the first function is to change characteristics of a fishing reel, including a braking force adjustment, a drag force adjustment, a change of a fishing line type, or a line length reset.

In a fishing reel according to an embodiment of the present disclosure, the second function includes an event recording, a drag force adjustment, or an adjustment of the winding speed of a spool.

According to the above embodiment, it is possible to provide a reel having an operation means with high layout flexibility, a reel capable of recording events, or a reel capable of performing a plurality of functions with a single operation means.

DETAILED DESCRIPTION

Hereinafter, embodiments of the present disclosure will be described in detail with reference to the accompanying drawings. Components that are common in the plurality of drawings are denoted by the same reference numerals throughout the plurality of drawings. It should be noted that each of the drawings is not necessarily scaled for convenience of explanation.

Figure 1A:
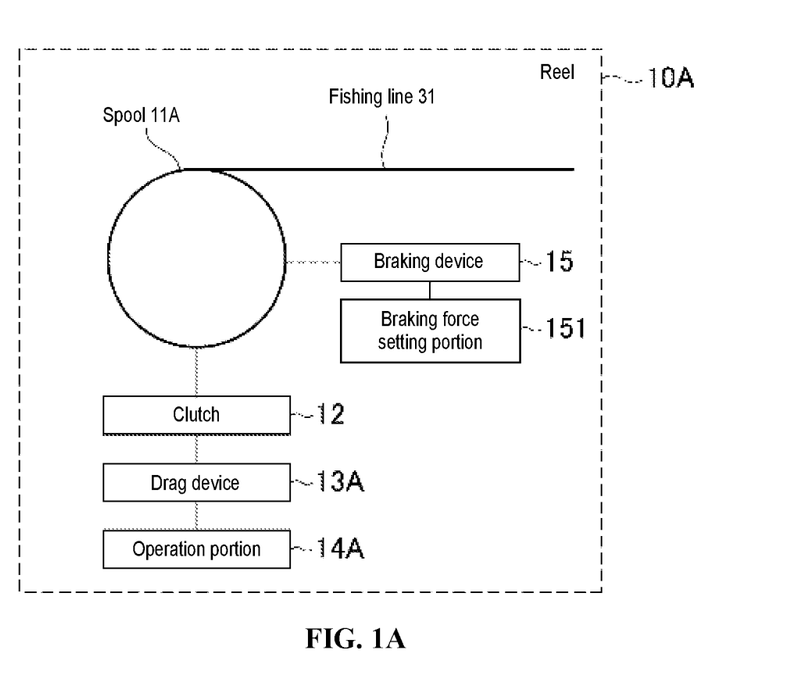
FIG. 1A is a diagram illustrating a fishing reel 10 according to an embodiment of the present disclosure.
Figure 1B:
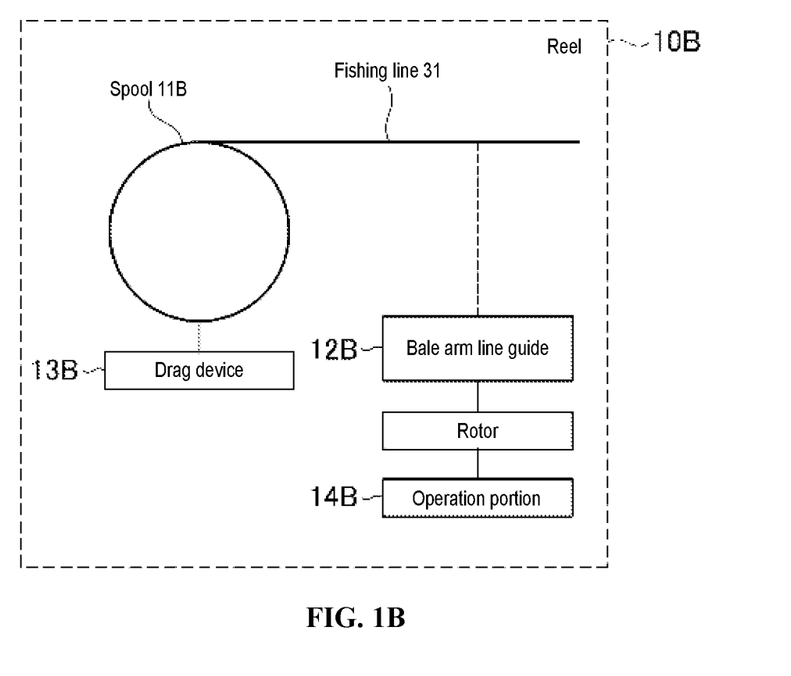
FIG. 1B is a diagram illustrating a fishing reel 10 according to an embodiment of the present disclosure.
Figure 2:
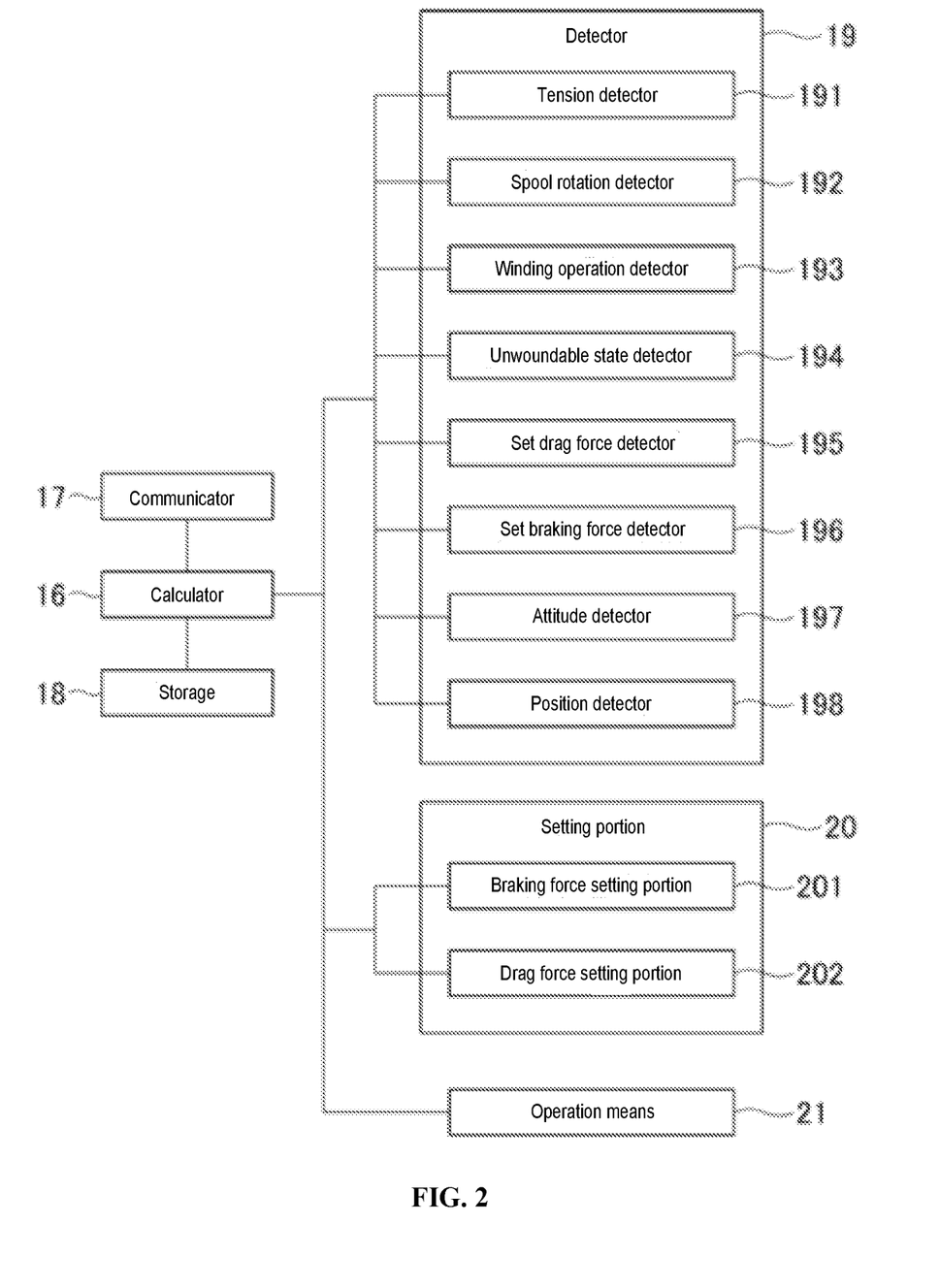
FIG. 2 is a diagram illustrating the fishing reel 10 according to an embodiment of the present disclosure.

A configuration of the fishing reel 10 according to an embodiment of the present disclosure will be described with reference to FIGS. 1 to 3. FIG. 1 shows the mechanical configuration of the fishing reel 10. FIG. 1 (A) shows a case where a double-bearing type reel is used as the fishing reel 10, and FIG. 1(B) shows a case where a spinning-type reel is used.

First, a double-bearing reel 10A will be described with reference to FIG. 1(A). A spool 11A is capable of winding a fishing line 31, and can wind the fishing line 31 when rotated forward by a winding operation portion (winding operation unit) 14 (or simply an operation portion 14). For a clutch 12, the connection/disconnection of the power transmission to/from the winding operation portion 14A can be selected. In a connected state, the winding operation portion 14A can perform winding operation. In a disconnected state, the spool 11A can be freely rotated forward and backward, which makes it possible to unwind the fishing line 31.

A drag device 13 can idle a spool 11 when a load equal to or greater than a set tension is applied to the fishing line 31. A device that can electrically adjust a set tension in accordance with a command signal may be used as the drag device. Said device includes a drag device using a powder-type brake, which is a technique known in the art, but is not limited to a specific mode.

The winding operation portion 14A is configured, for example, as a handle, and can transmit a user's rotation operation to the spool 11A through a transmission mechanism such as a gear, so that the spool 11A can be rotated forward. The winding operation portion 14A may also be a combination of an operation member such as a lever and a power source such as a motor.

A brake (braking unit or braking portion) (braking device) 15 can exert a braking force on a spool. This suppresses the occurrence of a backlash upon casting. The braking force can be set by a braking force setting portion (braking force setting unit) 151.

A device that can electrically adjust a braking force in accordance with a command signal may also be used as the braking device according to the present disclosure. Said device includes a braking device using a regenerative brake, which is a technique known in the art, but is not limited to a specific mode.

Next, a case where a spinning reel 10B is used as the reel 10 is described with reference to FIG. 1(b). A spool 11B is fixed to the reel body via a drag device 13B. The drag device 13B can idle the spool 11 when a load equal to or greater than a set tension is applied to the fishing line 31.

The fishing line 31 is guided to a line guide 12B and is wound on the spool 11B by the line guide 12B rotating around the spool 11. The line guide 12B is held at the tip of a rotor rotatably supported with respect to the reel body, and the fishing lien 31 can be made guidable or not by opening and closing a bale arm. When the bale arm is open, the line guide 12B becomes not woundable, and the fishing line 31 can be unwound. On the other hand, when the bale arm is closed, the line guide 12B becomes woundable, and the fishing line 31 cannot be unwound.

A winding operation portion 14B is configured, for example, as a handle, and can transmit a user's rotation operation to a rotor through a transmission mechanism such as a gear, so that the line guide 12B can be rotated forward.

Next, the electrical configuration of the fishing reel 10 according to an embodiment of the present disclosure will be described with reference to FIG. 2. As illustrated, the fishing reel 10 has a detector (detecting unit or detecting portion) 19 that detects various operations by a user and the state of a reel. The detection results are sent to a calculator (calculating unit or calculating portion) 16, and can be displayed on a display (displaying unit or displaying portion) 17 after calculation or temporary storage in a storage (storing unit or storing portion) 18 as necessary, can be sent to a setting portion (setting unit) 20 as command values, or can be used for secondary use in an external device.

The display 17 may be an external device such as a smart phone, wearable terminal, notebook PC, and a fishing finder, or may be realized by providing an LCD or the like on a fishing reel or a fishing rod. When the display 17 is disposed on an external device, the fishing reel 10 is provided with a communication portion (communication unit) that enables wireless/wired communications and the like. Further, an operation portion (operation means) 21 receives an operation by a user. The components shown in FIG. 2 described above are powered from a power source such as a battery (not illustrated) as needed.

Next, the detector 19 includes the followings. Some may be omitted due to restrictions on costs, sizes and the like. A tension detector 191 detects a tension acting on the fishing line 31. It can be realized by techniques known in the art, such as detecting by a strain sensor a force acting on the rotation axis of a pulley that guides the fishing line 31.

A spool rotation detector (spool rotation detecting unit or spool rotation detecting portion) 192 detects the rotation of the spool 11. It can be realized by techniques known in the art, such as an incremental-type rotation sensor using a photo interrupter. A non-contact type rotation sensor is desirable to achieve smooth rotation of the spool 11.

A winding operation detector (winding operating detecting unit or winding operation detecting portion) 193 detects the rotation of the winding operation portion 14. It can be realized by attaching a rotation sensor to the winding operation portion 14, or a gear or the like that rotates in conjunction with the winding operation portion 14. The amount of idling by the drag device 13 can be calculated by taking the difference between the winding operation detector 193 and the spool rotation detector 192.

An unwoundable state detector (unwoundable state detecting unit or unwoundable stated detecting portion) 194 detects whether or not the fishing line 31 can be unwound from the reel 10. In the exemplary double-bearing fishing reel 10A described above, it can be realized by detecting the connection status of the clutch 12. A limit sensor or the like may be attached to part of the member on which the clutch operates.

In the exemplary spinning reel 10B, it can be realized by detecting the open/close status of a bale arm. A limit sensor or the like may be attached to part of the member on which the bale arm operates.

Further, a set drag force detector (set drag force detecting unit or set drag force detecting portion) 195 detects a set tension that is a threshold at which the spool 11 idles. It can be realized by, for instance, detecting charging force acting on a friction member in a drag device with a pressure sensor.

Further, a set braking force detector (set braking force detecting unit or set braking force detecting portion) 196 detects a set value of the braking force for backlash suppression. It can be realized by providing a volume resistance or the like to the braking force setting portion 151. In a type of braking device that sets a braking force by computer, the set braking force detector 196 can by realized by obtaining a command value to the braking device.

An attitude detector (attitude detecting unit or attitude detecting portion) 197 detects the attitude of the reel 10. It can be realized using a method for, for example, detecting the geomagnetic direction with respect to the reel 10 with a geomagnetic sensor, and detecting the gravity acceleration direction with respect to the reel 10 with an acceleration sensor. A sensor called a nine-axis motion sensor that detects the direction, acceleration and angular velocity of each of orthogonal three axes can also be used.

A position detector (position detecting unit or position detecting portion) 198 acquires the position information of the fishing reel 10. It can be realized by, for example, an antenna that can acquire GPS information. The position detector 198, which is provided not only inside the fishing reel 10, but also in a smartphone, may also acquire position information through the Near Field Communication such as BLE communication.

A setting portion 20 changes the set values of devices by sending command values to each of such devices in the reel 10. A braking force setting portion 201 transmits command values to the brake 15 capable of electrically adjusting a braking force. The brake 15 adjusts the braking force according to the command value. A drag force setting portion (drag force setting unit) 201 transmits a command value to the drag device 13 capable of electrically adjusting tension. The drag device 13 adjusts the tension to start idling in accordance with the command value.

The operation portion (operation means) 21 accepts a user's operation. In the fishing reel 10 according to an embodiment of the present disclosure, it is an electrical operation means, more specifically, any one of a toggle switch, a membrane switch, a push button switch, a touch panel, and an operation lever.

Various operation means known in the art can be used according to a user's operation, which include a method for switching between contact and non-contact of an electrical contact, detecting voltage changes using a resistive film, and detecting changes in capacitance. These are sealed in an enclosed structure or otherwise appropriately waterproofed.

Figure 3:
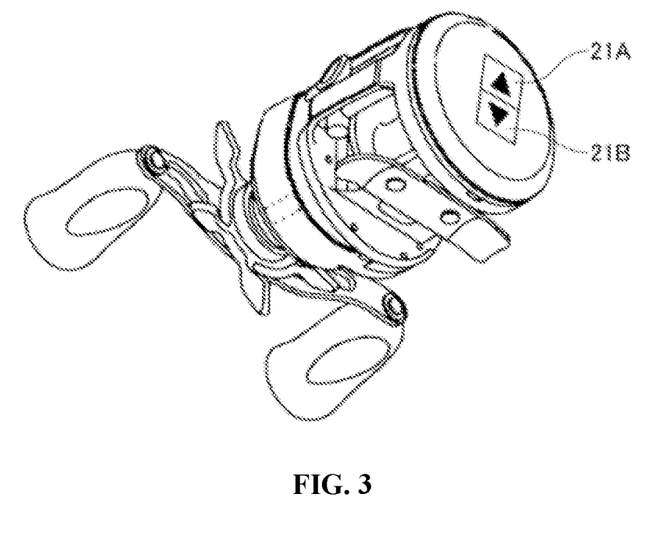
FIG. 3 is a diagram illustrating the fishing reel 10 according to an embodiment of the present disclosure.

FIG. 3 shows a perspective view of the reel 10 provided with the operating means 21. In this example, two membrane switches, which are provided on the side plate of the reel 10, are used as the operation means 21. Using membrane switches realizes cost reduction, thinner operation means, easier waterproofing, good operability, high design flexibility, high layout flexibility and the like. In the following explanation, a switch 21A is referred to as an upper button, and the other switch 21B is referred to as a lower button.

Next, an operation performed when the operation portion (operation means) 21 is operated will be described. First, a case where the operation means 21 is used to change the setting of the brake 15 will be described as an example. In this example, when the upper button is pressed, the braking force of the brake 15 is set to "strong". When the lower button is pressed, the braking force of the brake 15 is set to "weak".

When the operation means 21 is pressed, or in accordance with the braking force after the change, a setting change may also be notified to a user in a recognizable way by flashing an LED or giving a beep. Changing the setting of the brake 15 as described above is effective to increase the layout flexibility of the operation means 21. Further, reactions to operations can be changed by changing software by an external device such as a smartphone, thereby expanding the range for the change when the operation means is pressed.

Next, a case where the operation means 21 is used for recording events will be described as an example. In this example, when the upper button is pressed, the storage 18 stores the occurrence of an event 1. When the lower button is pressed, the storage 18 stores the occurrence of an event 2. Further, when the upper and lower buttons are pressed at the same time, an event 3 is stored. Different events may be stored depending on the operating method of the operation means 21, such as storing an event 4 by double-clicking the upper button or storing an event 5 by long-pressing the button. This makes it possible to increase the types of events to be recorded without increasing the number of operation means.

The event 1, event 2, . . . event N are assigned to events that a user wants to remember while fishing, which include when the user catches a fish, when a fish bites a hook, and when a hook is caught on an obstacle (snagging). Upon the occurrence of any of such events, the user can perform an operation corresponding to the event, thereby storing the time of occurrence of such event in the storage 18. Also, when the operation means is pressed upon the occurrence of an event, the information may be transmitted to an external device for secondary use. That is, it may also be used as a trigger signal to start or stop video recording upon the occurrence of an event with the use of an imaging device such as a video camera as an external device.

Figure 4:
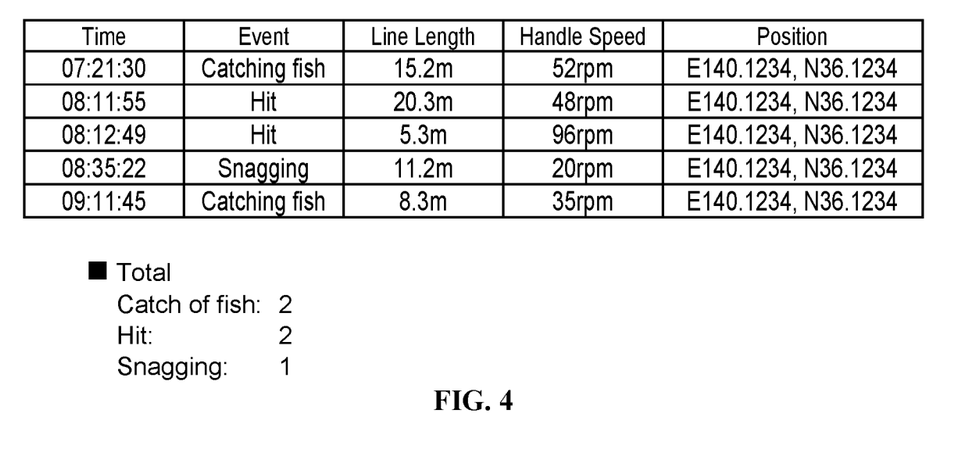
FIG. 4 is a diagram illustrating an example of an event recording in the fishing reel 10 according to an embodiment of the present disclosure.

FIG. 4 shows an example of recording an event. This example shows a list of events logged by a user in a day's fishing. As in this example, not only the type and time of the events, but also information on the operation and state of the reel 10, such as the length of a fishing line, the rotation speed of a handle, and the position of a reel upon the occurrence of such events, may also be recorded. Further, a total value for each event may be calculated and displayed. This makes it possible to display the total value and the like of the fishes caught.

When a button for event recording is arranged on the fishing reel 10 as in the present embodiment, the operating means can be arranged in a fine place to operate during fishing. In this way, the operating means can be operated simultaneously with the occurrence of an event. Further, it is easy to arrange a substrate, a battery and the like inside the fishing reel 10. This is because if an event recording button is arrange in a place other than the fishing reel 10, it is probably often difficult to operate the button when, for example, fighting a fish.

Next, an example in which the operating means 21 is used for a plurality of functions will be described. In the present embodiment, an operation to be performed when the operating means 21 is operated is changed depending on the state of the fishing reel 10. More specifically, for example, the state of the clutch 12 is detected by the unwoundable state detector 194, and the operation is changed depending on the results. In the event the operation means 21 is operated when the clutch is connected and the spool 11A is in a state in which a fishing line cannot be unwound (a state in which the fishing line can be wound up by the winding operation portion 14A), the event recording function referred to above is performed. On the other hand, in the event the operation means 21 is operated when the clutch is disconnected and the spool 11A is in a state in which a fishing line can be unwound (a state in which a fishing line cannot be wound up by the winding operation portion 14A), the braking force adjustment function of the brake 15 is performed.

In this manner, changing the function of the operating means according to the state of the reel 10 makes it possible to perform a plurality of functions with a single operation means. Therefore, even if there is an increase in the number of functions, an increase in the number of operation means can be avoided; therefore, it is possible to realize a downsizing of the entire device.

The function performed when the operation means is operated is not limited to the above-described example, and can be used for various setting changes in the reel 10 and operations, which more specifically include changing of a set drag force of the drag device 13, setting of a reference length of a fishing line (zero value reset), changing of a fishing line type (changing of a calculation parameter when calculating a line length from a spool rotation speed), and changing of the winding speed of the winding operation portion 14 (when an electric fishing reel is used as the winding operation portion 14A). In this case, the operability is improved if a function to be operated while fishing is assigned when the clutch is connected, and a function to be performed during preparation is assigned when the clutch is disconnected. Moreover, the function in each state may also be assigned according to a user's preference by operating a smartphone or the like to change the settings of software.

Functions to be operated while fishing include a function of event recording, changing of a set drag force of a drag device, and changing of the winding speed of the winding operation portion 14. Functions to be performed during preparation include setting of a reference line length, changing of a fishing line type, and changing of a set drag force of a drag device. For the determination criterion of the state of the fishing reel 10, the values of not only the unwoundable state detector 194, but also another detector 19 may be used. For example, similar effects can also be achieved by, for example, performing the first function when the elevation angle of the fishing rod is equal to or greater than a predetermined value, and performing the second function when the elevation angle of the fishing rod is equal to or less than a predetermined value, based on the detection results from the attitude detector 197. Alternatively, the third and fourth functions may be performed by setting the second and third predetermined values. In this case, the operability is improved if the function currently performed is displayed for a user by an LED or the like.

Further, the function may also be switched according to the length of an unwound fishing line calculated based on the spool rotation speed detected by the spool rotation detector 192 and the winding operation detector 193. For example, the first function may be performed when the length of an unwound fishing line is equal to or greater than a predetermined value (e.g., equal to or greater than 3 m), and the second function may be performed when the length of an unwound fishing line is equal to or less than a predetermined value (e.g., equal to or less than 3 m). In this case, the operability is improved if the function to be performed while fishing is performed when said unwound fishing line length is equal to or greater than a predetermined value, and the function to be performed during preparation is executed when said unwound fishing line length is equal to or less than a predetermined value.

Further, the function to be performed may also be switched according to the operation method of the operation means 21, not the state of the fishing reel 10. In the present embodiment, functions are assigned so as to perform the following operations. When the upper button is pressed, the braking force of the brake 15 is increased (function 1). When the lower button is pressed, the braking force of the brake 15 is reduced (function 2). When the upper and lower buttons are pressed at the same time, the occurrence of an event 1 is stored (function 3). Assigning functions in this manner makes it possible to perform a plurality of functions with a single operation means as in the above-described embodiment.

As described above, the fishing reel 10 according to an embodiment of the present disclosure makes it possible to provide a reel having an electrical operation means with high layout flexibility, a reel capable of recording events, or a reel capable of performing a plurality of functions with a single operation means.

The dimensions, materials and arrangements of each component described herein are not limited to those explicitly described in the embodiments, and each component can be modified to have any dimension, material and arrangement that can be included within the scope of the present disclosure. Further, components that are not explicitly described herein may be added to the described embodiments, or some of the components described in each embodiment may also be omitted.

DESCRIPTION OF THE NUMERICAL REFERENCES

10 Fishing reel
11 Spool
12 Clutch
13 Drag device
14 Operation portion
15 Brake (braking device)
16 Calculator
17 Display
18 Storage
19 Detector
20 Setting portion
21 Operation portion (operation means)
31 Fishing line

What is claimed is:
1. A system comprising a fishing reel having a communication portion and an operation portion, and an external device having a display, wherein as a result of the manipulation of the operation portion, a first function is performed when the fishing reel is in a first state, and a second function is performed when the fishing reel is in a second state, and
wherein an operation result of the operation portion is sent to the external device via the communication portion, and the operation result of the operation portion is displayed on the display of the external device.

2. The system according to claim 1, wherein the external device is a smart phone, a wearable terminal, a notebook PC, or a fishing finder.

3. The system according to claim 1, comprising a brake, wherein when the operation portion is operated a range of a change of a braking force of the brake is changed.

4. The system according to claim 1, wherein the operation result of the operation portion is sent to the external device via the communication portion, and wherein the external device is configured to start or stop video recording in accordance with the operation result.

5. The system according to claim 1, comprising a storage, the storage being configured to store information on a type of an event, a time of an event, and information on an operation and a state of the fishing reel.

6. The system according to claim 5, wherein the information on the operation and the state of the fishing reel includes a length of a fishing line, a rotation speed of a handle, or a position of a reel upon an occurrence of an event.

7. The system according to claim 1, wherein the first function is to change characteristics of the fishing reel, including a brake force adjustment, a drag force adjustment, a change of a fishing line type, or a line length reset.

8. The fishing reel according to claim 1, wherein the second function includes an event recording, a drag force adjustment, or an adjustment of the winding speed of a spool.

\* \* \* \* \*